United States Patent
Flickinger et al.

(10) Patent No.: US 8,221,203 B1
(45) Date of Patent: Jul. 17, 2012

(54) KNIVES FOR ROTARY CHOPPER ASSEMBLY OF A COMBINE HARVESTER

(75) Inventors: Wayne T. Flickinger, Oxford, PA (US); Bradley J. Wagner, Orrtanna, PA (US); Jonathan E. Ricketts, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/020,841

(22) Filed: Feb. 4, 2011

(51) Int. Cl.
*A01F 12/40* (2006.01)

(52) U.S. Cl. ........................................ 460/112

(58) Field of Classification Search .................. 460/112, 460/111, 901; 56/504, 505; 241/101.76, 241/190, 194, 88.4, 243, 286
See application file for complete search history.

(56) References Cited

U.S. PATENT DOCUMENTS

| | | | |
|---|---|---|---|
| 1,761,083 A | | 6/1930 | Liggett |
| 2,842,175 A | | 7/1958 | Thompson |
| 3,000,165 A | * | 9/1961 | Lill ................... 56/13.4 |
| 3,309,854 A | * | 3/1967 | Mitchell et al. ................. 56/504 |
| RE26,871 E | * | 4/1970 | Morkoski et al. ............. 241/291 |
| 3,606,748 A | * | 9/1971 | Middlesworth ................. 56/294 |
| 3,831,357 A | * | 8/1974 | Mathews ......................... 56/294 |
| 3,874,604 A | * | 4/1975 | Gronberg et al. ............. 241/243 |
| 4,077,573 A | | 3/1978 | Kersey et al. |
| 4,211,060 A | * | 7/1980 | Rhodes ........................... 56/294 |
| 4,612,941 A | * | 9/1986 | Kunde .......................... 460/112 |
| 4,804,047 A | | 2/1989 | Kobashi et al. |
| 5,042,973 A | * | 8/1991 | Hammarstrand ............. 460/112 |
| 5,272,861 A | | 12/1993 | Roynberg |
| 5,556,042 A | * | 9/1996 | Roberg .................... 241/101.76 |
| 5,577,375 A | | 11/1996 | Tillison, Sr. |
| 5,974,776 A | * | 11/1999 | Prellwitz ......................... 56/504 |
| 6,101,800 A | | 8/2000 | Juraco et al. |
| 6,120,373 A | | 9/2000 | Schrattenecker |
| 6,152,820 A | * | 11/2000 | Heidjann et al. ............. 460/112 |
| 6,251,009 B1 | * | 6/2001 | Grywacheski et al. ........ 460/112 |
| 6,616,528 B2 | * | 9/2003 | Wolters et al. ................ 460/111 |
| 6,699,121 B2 | * | 3/2004 | Bognar et al. ................ 460/112 |
| 6,783,453 B2 | * | 8/2004 | Bueermann et al. .......... 460/112 |
| 6,829,879 B2 | * | 12/2004 | Weichholdt ..................... 56/504 |
| 7,867,072 B2 | * | 1/2011 | Lauwers et al. .............. 460/112 |
| 7,988,080 B2 | * | 8/2011 | Benes et al. ..................... 241/73 |
| 2002/0169011 A1 | * | 11/2002 | Wilson .......................... 460/111 |
| 2008/0293461 A1 | | 11/2008 | Benes et al. |

* cited by examiner

*Primary Examiner* — Arpad Fabian-Kovacs
(74) *Attorney, Agent, or Firm* — Michael G. Harms

(57) ABSTRACT

A rotor chopper assembly including a chopper rotor having a mounting lug. A knife blade includes a body having an opening arrangement configured to receive a retention device securing the body to a member that is rotatably connected to the mounting lug of the chopper rotor. During unobstructed operation of the rotor chopper assembly, the body is centrifugally urged radially outward from the mounting lug. In response to the body striking an obstruction during operation of the rotor chopper assembly, the body is urged into rotational movement until the retention device abuts a stop formed in the mounting lug. An angle subtended between axes defining unobstructed operation and stop abutment is different for at least two openings of the arrangement of openings formed in the body.

19 Claims, 7 Drawing Sheets

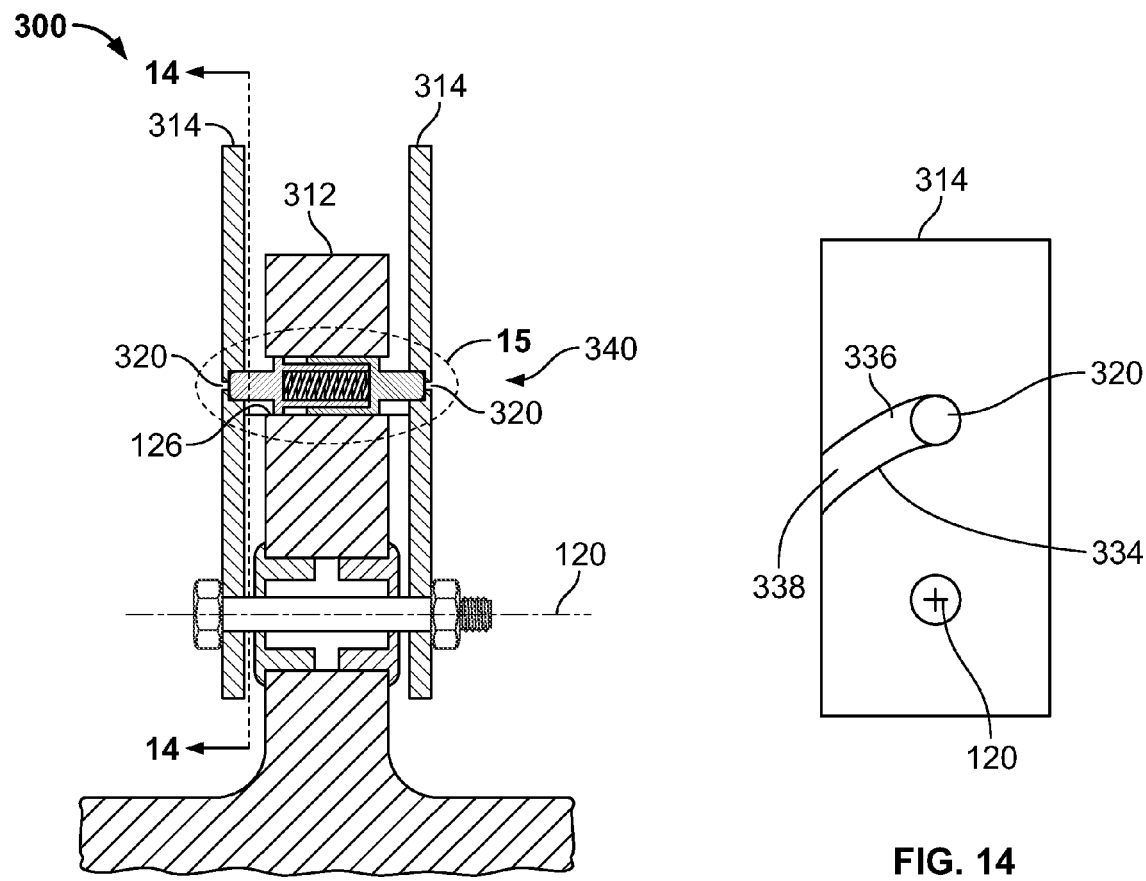
FIG. 13
FIG. 14
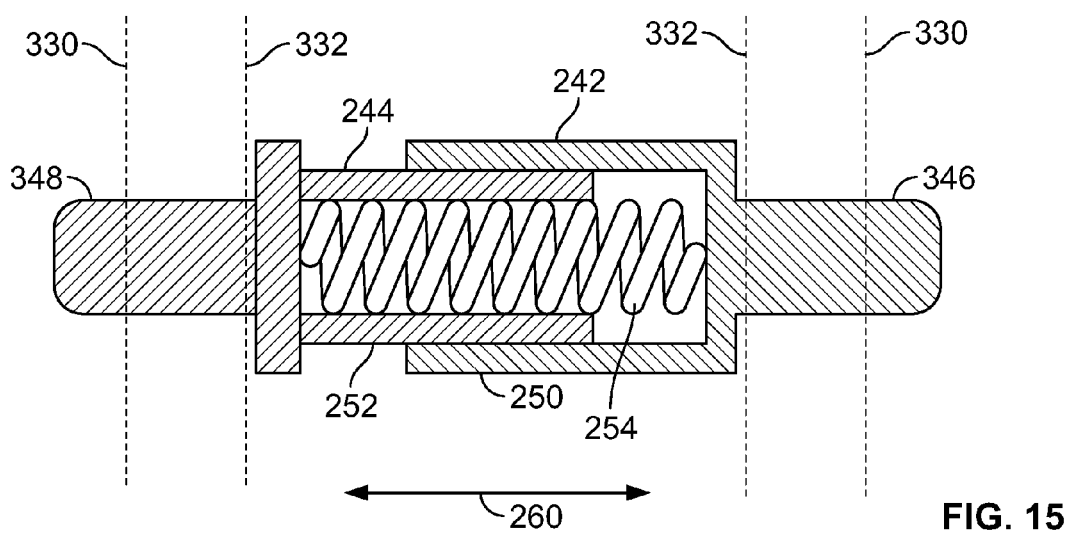
FIG. 15

KNIVES FOR ROTARY CHOPPER ASSEMBLY OF A COMBINE HARVESTER

FIELD OF THE INVENTION

The present invention relates generally harvesting devices. It relates more particularly to rotary chopper assemblies of harvesting devices.

BACKGROUND OF THE INVENTION

In the operation of a typical agricultural combine that employs a threshing rotor, the flow of crop residue, sometimes referred to as material other than grain (MOG), remaining after threshing is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies have operated to chop or pulverize the crop residue resulting from a harvesting operation into finer pieces and/or to spread the resulting crop residue, whether chopped into finer pieces by operation of a chopper assembly or passed to the spreader assembly as larger pieces of residue, onto and over the field. Such chopper and residue spreader assemblies have taken various forms, depending upon the desires of users and manufacturers.

Many typical harvesters have traditionally employed technology and methods that have become associated with what is sometimes referred to as a hood mount chopper. Generally, such hood mount choppers can be described as flail choppers, and the systems of which they are a part have evolved to the point that they may include over 100 flail knives on a rotating chopper, mounted within a dedicated housing that provides an appropriate environment for the operation of the rotating chopper so as to best maximize its performance. The rotating chopper of such a residue management system may often operate at or above 3000 RPM and provide suitable and sufficient energy to the chopped material to be able to effect a spread of the chopped material over a width of up to 40 feet, which width generally corresponds to the cut width of the header. Such a residue management system is thus operable for its intended purpose of chopping and spreading the chopped material over a field, and generally operates effectively in such regard. With such a system, if a user does not desire to chop the straw, he may turn the chopper off and bypass, or route the material flow around, the chopper.

Typical Case IH harvesters, however, have, for over 25 years now, in an effort to provide greater equipment versatility while reducing equipment complexities, typically employed a somewhat different technology in the residue management systems thereof. Such alternative technology, the primary purpose of which has been the transport of material away from the threshing system, has utilized a multifaceted construction that affords greater versatility in the transport of such material in that such material can not only be transported, but can also be treated in varying manners dependent upon the desires of operators. Such constructions have come to be known as integral choppers or integral chopper or chopping systems due to the integration of a chopping function, in addition to the primary transport function, into the combine and its operations. Such integral chopper systems, because of their positioning within the combine and their functional capabilities, offer a versatility not generally available with the hood mounted chopper systems.

Such integral chopper systems have been so designed that, as noted hereinabove, their primary function is the transport of material away from the threshing system and a secondary function is the treatment of such material as it is being so transported. Such operations are usually effected in one of two different ways. Most commonly, the integral chopper system is operated to transport the material from the threshing system to a spreading system as a rotary chopper element or portion rotates at or near 3000 RPM so as to quickly move the material rearwardly and to also chop it into smaller pieces as it is being so transported. Less commonly, the integral chopper system is operated to more gently transport the material from the threshing system to a spreading system as the rotary chopper element operates at a much slower speed, typically at only about 800 RPM, with considerably less chopping activity. In the former instance, the desire and expectation is that the material will be transported and that the shortest mean length of cut will be realized to allow for modern minimum tillage applications while the chopping is accomplished using as little power as possible. In the latter instance, the desire and expectation is that the material will be transported in such a manner as to provide the longest and least damaged straw possible.

Such integral chopper systems, which are based upon a legacy design utilized by Case IH harvesters for approximately 25 years, have recognized advantages over hood mounted chopper systems in that they often allow combines to be manufactured with simpler designs and fewer moving parts, resulting in less expensive base units and lighter weight products, while typically performing at levels competitive to performance standards of hood mounted choppers. Despite the recognized versatility and advantages of the integral chopper systems, attempts to improve such systems have continued, fueled in part by customer and critiques and demands, including beliefs expressed by some users that the chop quality realizable by integral chopper systems, at least in length of cut (LOC), has remained inferior to the chop quality that could be realized by hood mounted choppers, as well as stated desires by users for integral chopper systems that can better absorb impacts with foreign objects without significant damage or breakage.

In light of these and other concerns raised by users, and to address various European marketing demands, attempts have been made in more recent years to develop new types of integral chopper systems, including integral chopper systems that could utilize flail-type elements and connectors instead of fixed and rigidly mounted knife blades on the rotary element. In general, such integral chopper systems have met with limited success, due in part to difficulties in dealing with the increase in material throughput that has been experienced over the past 10 years as machine capacities, and consequent demands upon the integral position, have increased.

More particularly, at least with respect to flail-type integral chopper systems, it has proven difficult to achieve a system that can, to the desired degrees, effectively offer and provide the dual capabilities of, in one alternative, chopping into or reducing the residue to finer pieces for spreading as such residue is transported rearwardly and, in the other alternative, more gently transporting the residue, in larger pieces, rearwardly for windrowing. The use of flail-type elements and mountings in lieu of fixed and rigidly mounted knife blades on the rotary element has generally not resulted in the degree of success and satisfaction desired therefore, especially when such an integral chopper system has been operated as an 800 RPM flail chopper. In such operation, the flail-type elements, due to the lack of inertia associated therewith, have sometimes, even in the absence of heavy loading, folded back along their direction of travel and caused plugging of the harvester and consequent reliability problems. Such factor has been seen as a significant limitation to, and disadvantage of, a flail-type integral chopper as opposed to a fixed blade integral chopper.

On the other hand, such flail-type integral choppers offered one significant advantage over fixed blade integral choppers in that they could, unlike fixed blade integral choppers, better absorb energy when foreign objects, such as auger fingers or rocks, were encountered within the crop residue flow during operations. Often, with a fixed blade integral chopper, an impact with such a foreign object, especially if relatively severe, would effect mission disabling damage to a fixed blade integral chopper system, such as by cracking or breaking either or both the rotating knife blades or the stationary counter knife elements, or even snapping off the knife blade or element or breaking off its mounting, resulting in missing knife blade components and denigrating the performance of the assembly. With the flail-type integral choppers, however, the rotating flail-type elements could fold back if and when a foreign object became captured by the stationary knife elements, thereby significantly minimizing the possibility of damage to or breakage of the stationary knife elements or the rotating flail-type elements.

Consequently, attempts to develop improvements to these systems have continued. The ongoing challenge has been to develop a chopper assembly that can offer the advantages desired while overcoming or minimizing the disadvantages that have been encountered with prior art systems. These chopper system improvements, as discussed and described hereinafter, are newly developed and employ various inventive concepts to realize in great part the various advantages sought therefore while overcoming and/or minimizing the difficulties and disadvantages associated with the prior art constructions.

SUMMARY OF THE INVENTION

The present invention relates to a knife blade for a rotor chopper assembly including a body having an arrangement of openings. Each opening of the arrangement of openings is configured to receive a retention device securing the body to a member that is rotatably connected about a first axis to a mounting lug of a chopper rotor. The first axis is substantially parallel to the axis of rotation of the chopper rotor. During unobstructed operation of the rotor chopper assembly in which the body is centrifugally urged radially outward from the mounting lug about the first axis, the retention device and the first axis define a second axis. In response to the body striking an obstruction during operation of the rotor chopper assembly, the body is urged to rotate about the first axis until the retention device abuts a stop formed in the mounting lug, the retention device and the first axis defining a third axis. An angle subtended between the second axis and the third axis is different for at least two openings of the arrangement of openings formed in the body.

The present invention further relates to a rotor chopper assembly including a chopper rotor having a mounting lug and a knife blade including a body having an opening arrangement. Each opening of the opening arrangement is configured to receive a retention device securing the body to a member that is rotatably connected about a first axis to the mounting lug of the chopper rotor. The first axis is substantially parallel to the axis of rotation of the chopper rotor. During unobstructed operation of the rotor chopper assembly in which the body is centrifugally urged radially outward from the mounting lug about the first axis, the retention device and the first axis define a second axis. In response to the body striking an obstruction during operation of the rotor chopper assembly, the body is urged to rotate about the first axis until the retention device abuts a stop formed in the mounting lug, the retention device and the first axis defining a third axis. An angle subtended between the second axis and the third axis is selectably alterable.

The present invention yet further relates to a rotor chopper assembly including a knife blade including a body having a first aperture and an opening arrangement. The first aperture is configured to be alignable with a first bore of a mounting lug of a chopper rotor to receive a fastener defining a first axis that is substantially parallel to the axis of rotation of the chopper rotor. Each opening of the opening arrangement is configured to receive a retention device securing the body to a second bore formed in the mounting lug, the retention device defining a second axis that is substantially parallel to the first axis. The first axis fastener and the second axis retention device non-rotatably secure the body to the mounting lug of the chopper rotor during operating of the rotor chopper assembly in which impact loads encountered by the body do not exceed a predetermined shear load capability of the retention device. In response to the body encountering an impact load exceeding the predetermined shear load capacity of the retention device, the body is rotatable about the first axis. The retention device is configured for easy removal to selectably convert the body between a non-rotatable and a rotatable relationship with respect to the mounting lug. An angular orientation between the body in the non-rotatable relationship with respect to the mounting lug is selectably alterable.

The present invention still yet further relates to a rotor chopper assembly including a knife blade including a body having a first aperture and an opening. The first aperture is configured to be alignable with a first bore of a mounting lug of a chopper rotor to receive a fastener defining a first axis that is substantially parallel to the axis of rotation of the chopper rotor. The opening is configured to receive a retention device securing the body to a second bore formed in the mounting lug, the retention device defining a second axis that is substantially parallel to the first axis. The first axis fastener and the second axis retention device non-rotatably secure the body to the mounting lug of the chopper rotor during operating of the rotor chopper assembly in which impact loads encountered by the body do not exceed a predetermined shear load capability of the retention device. In response to the body encountering an impact load exceeding the predetermined shear load capacity of the retention device, the body is temporarily rotatable about the first axis, the retention device configured to reengage the opening.

The present invention yet further relates to a rotor chopper assembly including a knife blade including a body having a first aperture and an opening arrangement. The first aperture is configured to be alignable with a first bore of a mounting lug of a chopper rotor to receive a fastener defining a first axis that is substantially parallel to the axis of rotation of the chopper rotor. The opening arrangement is configured to receive a retention device securing the body in a non-rotatable relationship with respect to the mounting lug when the retention device is in a first position The retention device is selectably movable to a second position that does not engage the body. The first axis fastener and the retention device when selectably in the first position non-rotatably secure the body to the mounting lug of the chopper rotor during operating of the rotor chopper assembly in which impact loads encountered by the body do not exceed a predetermined shear load capability of the retention device. In response to the body encountering an impact load exceeding the predetermined shear load capacity of the retention device, the body is rotatable about the first axis. The retention device is configured to be movable between the first position and the second position to selectably convert the body between a non-rotatable and a rotatable relationship with respect to the mounting lug. An angular orientation between the body in the non-rotatable relationship with respect to the mounting lug is selectably alterable.

An advantage of the present invention is a knife blade usable in a flail-type application in which the amount of blade deflection may be selectably controlled.

A further advantage of the present invention is a knife blade that operates as a fixed-type blade that can be reset to its original position after an impact with an object to angularly deflect the blade in a manner similar to a flail-type blade.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 13 is a cross section of an alternate embodiment of a retention device of the present invention.

FIG. 14 is a view taken along 14-14 of FIG. 13 of the present invention.

FIG. 15 is an enlarged, partial view of region 15 taken from FIG. 13 of the present invention.

Wherever possible, the same reference numbers will be used throughout the drawings to refer to the same or like parts.

DETAILED DESCRIPTION OF THE INVENTION

Figure 1:
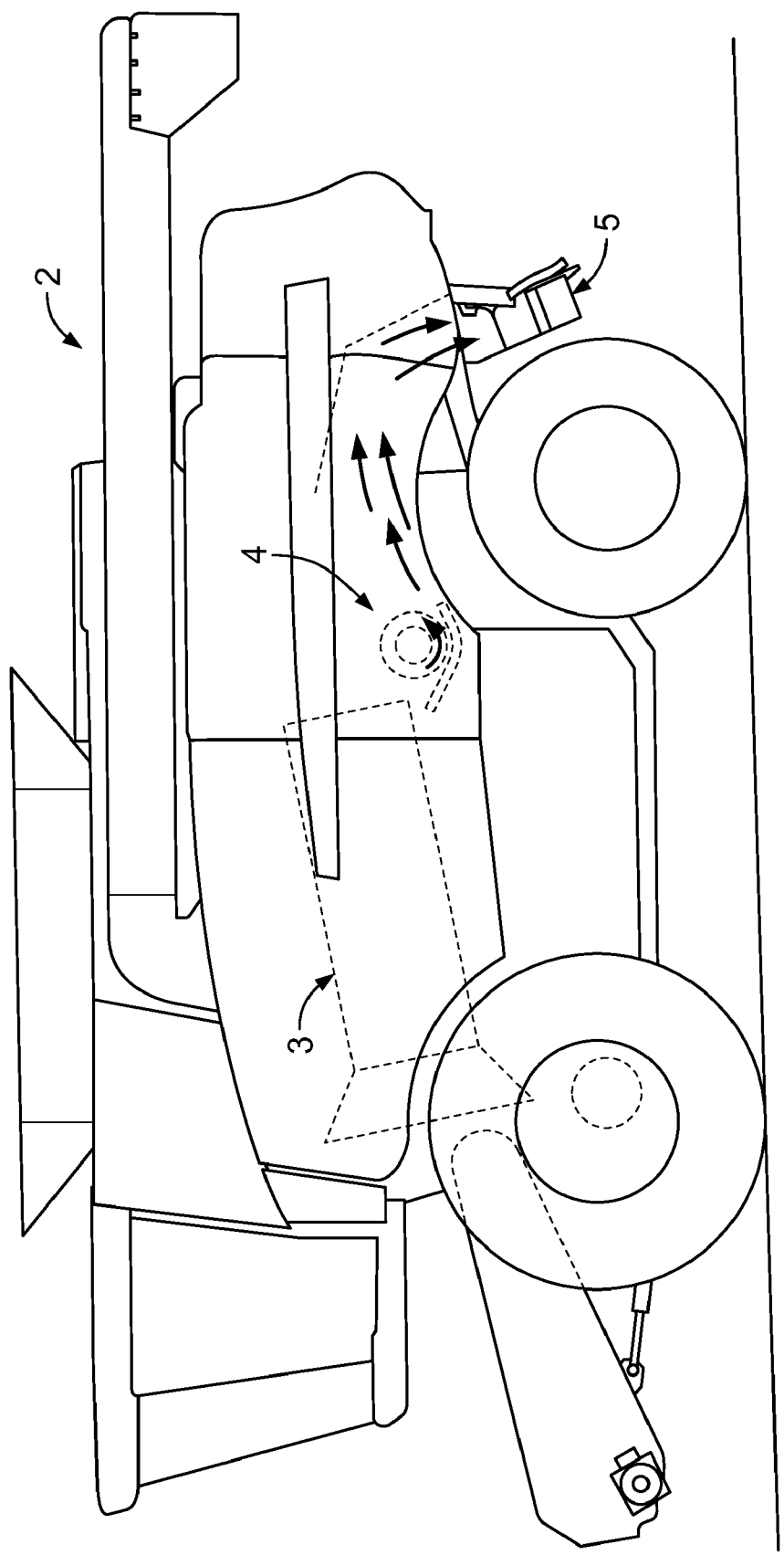
FIG. 1 is a side view of a crop harvesting vehicle containing a rotor chopper assembly of the present invention.
Figures 2, 3:
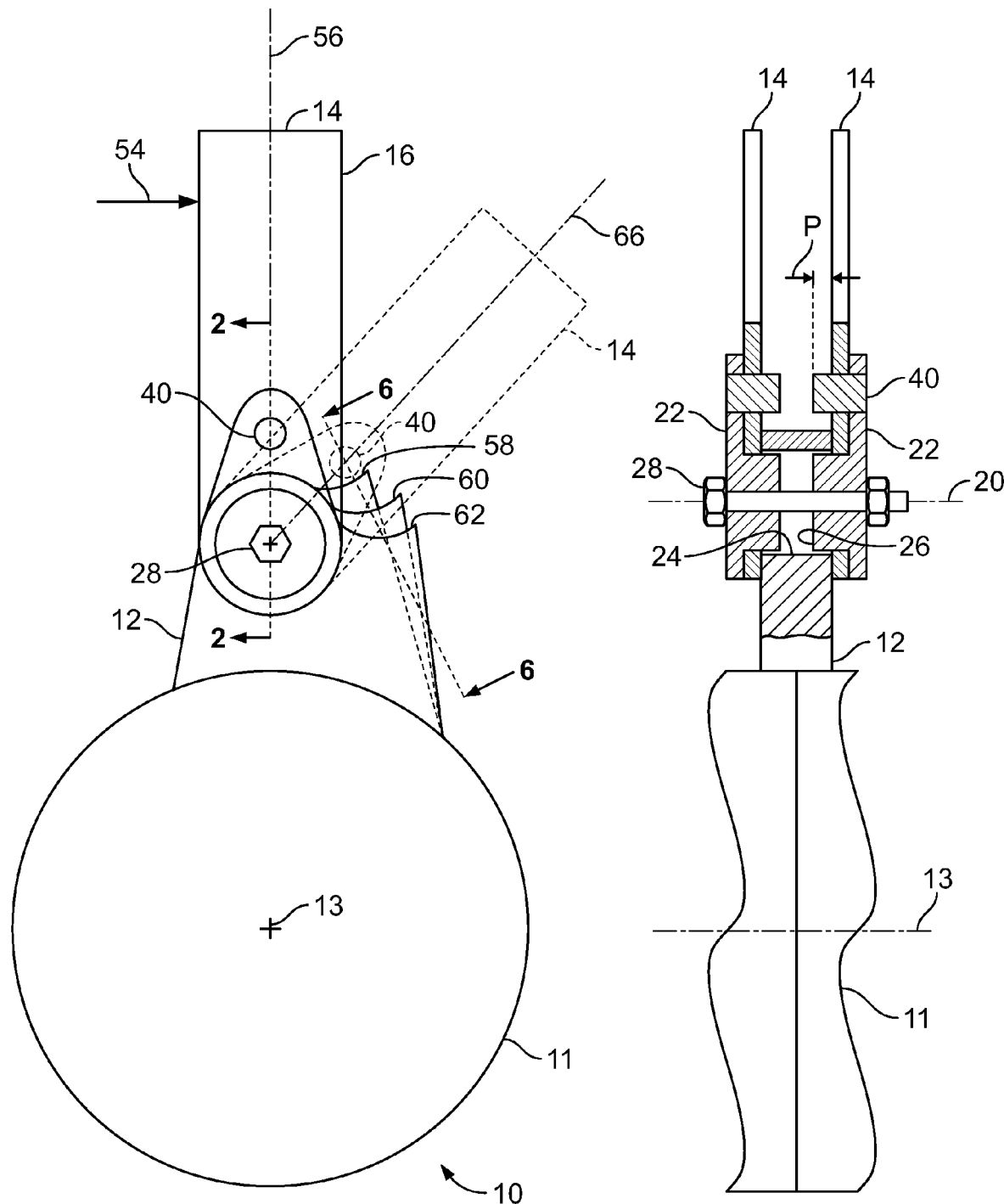
FIG. 2 is an end view of an embodiment of a rotor chopper assembly of the present invention.
FIG. 3 is a side view of the embodiment of the rotor chopper assembly of FIG. 2, including a partial cross section taken along line 2-2 of FIG. 2 of the present invention.

Referring now to the drawings, wherein preferred embodiments of an improved integral chopper assembly that includes the present invention are shown, wherein like numerals refer to like items, wherein certain elements and features may be labeled or marked on a representative basis without each like element or feature necessarily being individually shown, labeled, or marked, and wherein certain elements are labeled and marked in only some, but not all, of the drawing figures, FIG. 1 depicts a representative agricultural combine 2 that includes a longitudinally axially arranged threshing system 3 and a crop residue treatment and distribution system 4 with a crop residue spreader 5, all of which, except for the improved chopper assembly that is the subject hereof and which is included within the crop residue and distribution system 4, are of well known construction and operation. Further information may be found in Applicant's application Ser. No. 12/154,479, entitled Rotary Chopper Element Of An Integral Chopper Assembly Of A Combine Harvester, which is hereby incorporated by reference.

As further shown in FIGS. 2-7, crop residue treatment and distribution system 4 includes a rotor chopper assembly 10 having a chopper rotor 11 with a mounting lug 12 extending outwardly from the chopper rotor. Chopper rotor 11 has a rotation axis 13. Each knife blade 14 of a pair of knife blades 14 includes a body 16 having an aperture 18 that is configured to receive a member 22, such as a bushing. Member or bushing 22 includes a protrusion 26 that is configured to extend through aperture 18 of knife blade 14 and then partially extend inside of a first bore 24 formed in mounting lug 12 upon assembly. As further shown in FIG. 2, once assembly has been completed, a fastener 28 extends through the opposed protrusions 26, and collectively defines and secures a rotatable connection of the pair of knife blades 14 and corresponding members or bushings 22 about a first axis 20 with respect to mounting lug 12.

Figure 4:
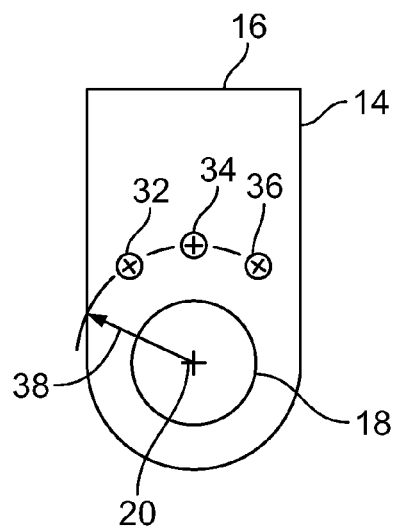
FIG. 4 is a plan view of an exemplary embodiment of a knife blade of the present invention.

To prevent relative rotational movement of knife blade 14 with respect to the corresponding bushing 22 about first axis 20, the knife blade includes an arrangement of openings. For example, as further shown in FIG. 4, openings 32, 34, 36 are arranged about a radius 38 from first axis 20 of aperture 18. Each bushing 22 includes a retention device, such as a shear pin 40 that is configured for insertion in one of the openings 32, 34, 36 of the arrangement of openings formed in knife blade 14. In one embodiment, retention device or shear pin 40 may be formed of unitary construction with bushing 22. In the arrangement as shown in FIG. 4, by virtue of each of the openings being equidistant from the axis of rotation of the knife blade, substantially the same shear force would be required to shear a pin inserted in any one of the openings. That is, a predetermined shear force 54 (FIG. 2) applied to knife blades 14 with respect to first axis 20 would be applied substantially equally to shear pin 40, irrespective of the installation of the shear pin in any of openings 32, 34, 36. In one embodiment, the arrangement of openings may include a single opening, and to include this embodiment, the term opening arrangement may be used. That is, the term opening arrangement may include a single opening formed in the knife blade, as well as a plurality of openings formed in the knife blade, but is otherwise intended to be interchangeable with the term arrangement of openings.

Figure 5:
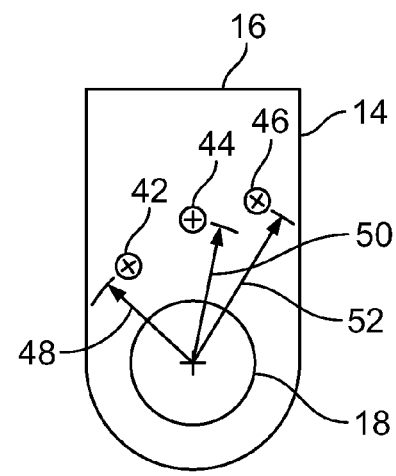
FIG. 5 is a plan view of an exemplary embodiment of a knife blade of the present invention.

FIG. 5 shows an alternate embodiment of knife blade 14, namely a different arrangement of openings formed in the knife blade. For example, each of openings 42, 44, 46 are arranged about a different respective radius 48, 50, 52 with respect to first axis 20 of aperture 18. In the arrangement as shown in FIG. 5, by virtue of each of the openings being located at a different distance from the axis of rotation of the knife blade, a different shear force would be required to shear a retention device or shear pin inserted in any one of the openings. That is, a predetermined shear force 54 (FIG. 1) applied to shear blades 14 with respect to first axis 20 would not be applied equally to retention device or shear pin 40, depending upon which of the openings 42, 44, 46 the shear pin is installed, due to the difference in resulting torque (as a result of the different distances of the respective openings from first axis 20 (FIG. 2)). In an alternate embodiment, each of the openings 42, 44, 46 may be sized differently to receive a correspondingly differently sized shear pin, such that the predetermined shear force required to shear each shear pin would be the same.

It is to be understood that for the knife blade, any of the openings 32, 34, 36, 42, 44, 46 may be sized differently or be of the same size, with the radial distance between the openings and the first axis 20 all being the same, all being different or any combination thereof, depending upon the application or operator preference. As further shown in FIGS. 4 and 5, the openings are not aligned with each other and first axis 20. That is, when assembled to form a portion of rotor chopper assembly 10 (FIGS. 1 and 2), the line defined by first axis 20 and the opening into which shear pin 40 is inserted is defined as a second axis 56. In a further embodiment (not shown), the openings may be radially aligned with respect to each other and also with respect to first axis 20 of aperture 18, so that the orientation of second axis 56 is the same, irrespective of which opening the shear pin is inserted.

Figure 6:
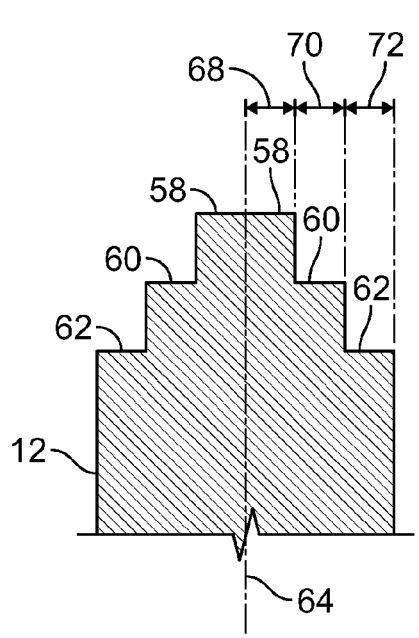
FIG. 6 is a partial cross section taken along line 6-6 of FIG. 2 of the present invention.

The type of knife blade shown in FIGS. 1-7 corresponds to a flail-type of blade, in which during unobstructed operation of the rotor chopper assembly 10, the knife blade 14 is centrifugally urged radially outward from the mounting lug 12 about first axis 20, the shear pin and the first axis defining second axis 56. As further shown in FIGS. 2, 6 and 7, mounting lug 12 includes a plurality of stops 58, 60, 62 formed therein. Stop 58 is positioned about a centerline axis 64 of mounting lug 12. Stop 58 further extends from either side of centerline axis 64 along the periphery of mounting lug 12 to a stop 60. Stop 60 further extends from either side of centerline axis 64 along the periphery of mounting lug 12 to a stop 62 as shown in FIG. 6, stop 62 extends from respective stops 60 to the opposed edges of the periphery of mounting lug 12. During operation of the rotor chopper assembly, stops 58, 60, 62 are configured to abut retention device or shear pin 40 associated with each knife blade 14 of the pair of knife blades striking an obstruction (not shown), resulting in an application of shear force 54 to the knife blades, and angularly rotating the knife blades about first axis 20. That is, as further shown in FIG. 2, upon shear pin 40 abutting stop 58, first axis 20 and shear pin 40 define a third axis 66.

In one embodiment, even if shear pin 40 is itself sheared during operation, the knife blade would continue to operate as a flail-type blade, although the position of the knife blade during obstructed operation may be different as compared to the position of the knife blade with the shear pin intact.

In the exemplary embodiment shown, a magnitude of protrusion P (FIG. 3) of each shear pin 40 determines which stop the shear pin abuts in response to a sufficient angular deflection of knife blade 14 about first axis 20. For example, as further shown in FIGS. 2, 6 and 7, if protrusion P extends to centerline axis 64 or within a distance 68 from centerline axis 64, the shear pin will abut stop 58. However, if protrusion P extends toward centerline axis 64, but the spacing from centerline axis 64 is greater than distance 68 but less than the sum of distances and 68 and 70 to centerline axis 64, the shear pin will abut stop 60. Finally, if protrusion P extends toward centerline axis 64, but the spacing from centerline axis 64 is greater than the sum of the distances 68 and 70 from centerline axis 64, but less than the sum of distances and 68, 70 and 72 to centerline axis 64, the shear pin will abut stop 62. In one embodiment, the distances, i.e., the widths, of the stops may not be symmetric about the centerline of the mounting lug. In another embodiment, the number of stops may be different than three per side of the mounting lug. In yet another embodiment, the stops may be configured for use with a single knife blade versus a pair of opposed knife blades.

It is to be understood that for the openings formed in knife blade 14, as shown in FIGS. 4 and 5, for a shear pin 40 having a predetermined length, i.e., resulting in a magnitude of protrusion P (FIG. 3), the magnitude of angular deflection defining a third axis 66 selectably alterable or different, such as depending upon which of the openings the shear pin is inserted. That is, depending upon which of the openings retention device or the shear pin is inserted, as well as the length of the retention device or shear pin, the angle subtended between second axis 56 and third axis 66 is selectably alterable. The selective alterability may be due to the angular offset or angular misalignment between openings 32, 34, 36 (FIG. 4) and between openings 42, 44, 46 (FIG. 5), as well as the resulting affect from the positions of stops 58, 60, and 62.

Figure 7:
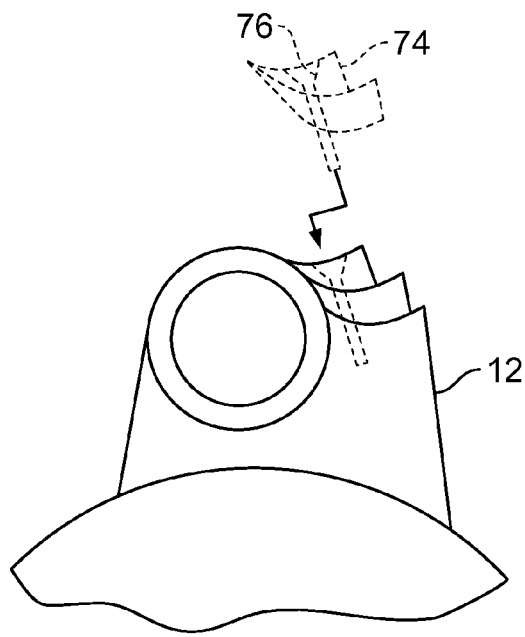
FIG. 7 is an enlarged, partial alternate embodiment of a rotor chopper assembly of the present invention.

In one embodiment, as further shown in FIG. 7, at least a partial set of stops 74 may be secured to mounting lug 12, such as by a fastener 76, providing potential multiple combinations of stops for a single mounting lug configuration.

It is to be understood that the relative positions and sizes of the openings of the knife blade, as well as the positions and sizes of the retention device or shear pins, as well as the positions and sizes of the stops, determine the angle subtended between second axis 56 and third axis 66. It is to be further understood that the impact of an obstruction may be of sufficient magnitude as to exceed a predetermined shear load capacity of the shear pin 40, i.e., shearing off the shear pin from the knife blade 14, so that the blade could rotate past the stops formed in the mounting lug.

Figure 8:
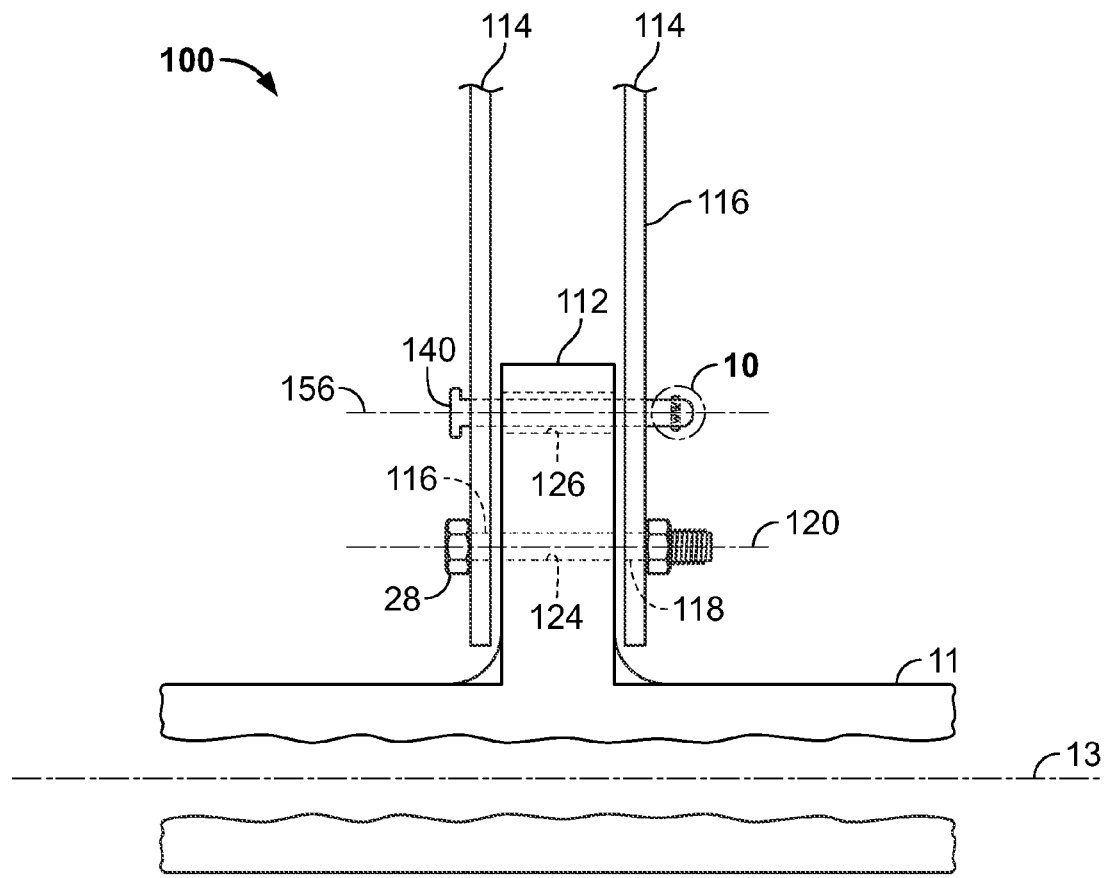
FIG. 8 is an end view of an alternate embodiment of a rotor chopper assembly of the present invention.
Figure 9:
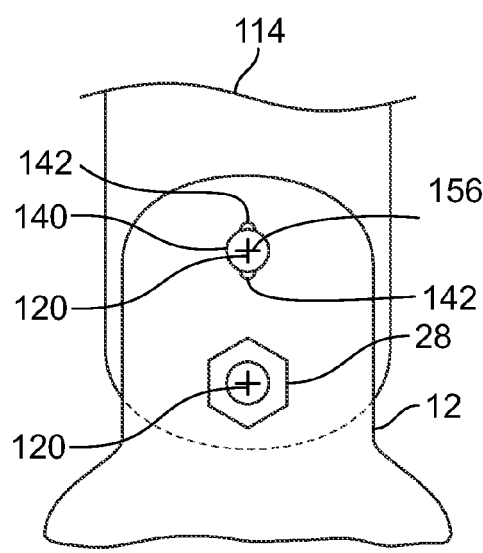
FIG. 9 is a side view of FIG. 8 of the present invention.
Figure 10:
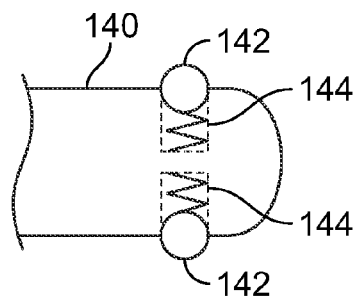
FIG. 10 is an enlarged, partial view of region 10 taken from FIG. 8 of the present invention.

FIGS. 8-10 show an embodiment of a rotary chopper assembly 100 having a chopper rotor 11 with a mounting lug 112 extending outwardly from the chopper rotor. Chopper rotor 11 has a rotation axis 13. Each knife blade 114 of a pair of knife blades 114 includes a body 116 having a first aperture 118 that is configured to be aligned with a first bore 124 of mounting lug 112 to receive a fastener 28 to be assembled to the knife blades and to the mounting lug. Upon assembly with fastener 28, the knife blades 114 and mounting lug 112 collectively define a rotatable connection of the pair of knife blades 114 about a first axis 120 with respect to mounting lug 112.

To prevent relative rotational movement of knife blade 114 with respect to mounting lug 112 about first axis 120, the knife blade may include an arrangement of openings, such as openings 32, 34, 36, 42, 44, 46 previously discussed in respective FIGS. 4 and 5. As further shown in FIG. 8, one opening of each of knife blades 114 is configured to be aligned with a second bore 126 of mounting lug 112 to receive a retention device 140 along a second axis 156 that is substantially parallel with first axis 120. As further shown in FIG. 10, retention device 140 includes a pair of balls 142 each biased outwardly by a spring 144, an arrangement also referred to as a "ball lock", to secure retention device 140 in position with respect to knife blades 114 and mounting lug 112. In other embodiments, other quick release fasteners such as cotter pins may be used.

The type of knife blade shown in FIGS. 8-10 correspond to a fixed type of blade, in which the first axis fastener 28 and the second axis retention device 140 non-rotatably secure knife blade 114 to the mounting lug 112 of the chopper rotor 11. During operation of the rotor chopper assembly in which impact loads encountered by knife blade 114 do not exceed a predetermined shear load capability of retention device 140, the knife blade does not rotate about first axis 120. However, in response to the body encountering an impact load exceeding the predetermined shear load capacity of the retention device, retention device 140 may be sheared off, so that the knife blade is rotatable about first axis 120. Retention device 140 is configured for easy removal to selectably convert knife blade 114 between a fixed or non-rotatable type of blade and a rotatable or flail-type of blade with respect to mounting lug 112, depending upon the application.

Figure 11:
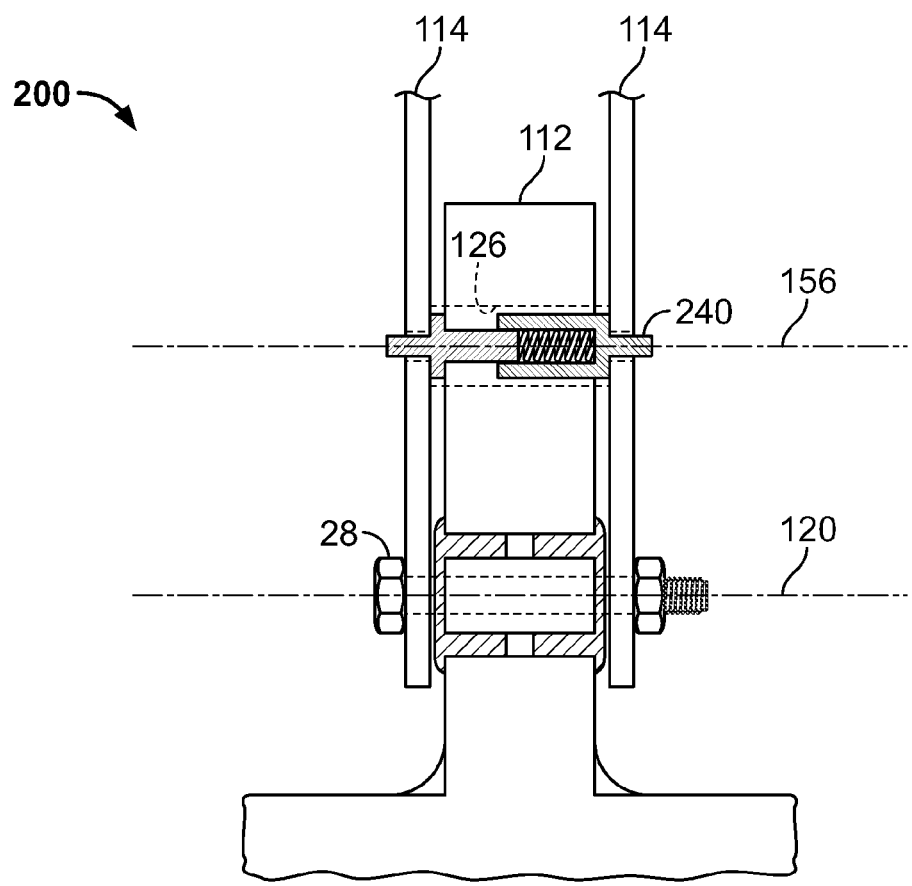
FIG. 11 is an alternate embodiment of a rotor chopper assembly of the present invention.
Figure 12:
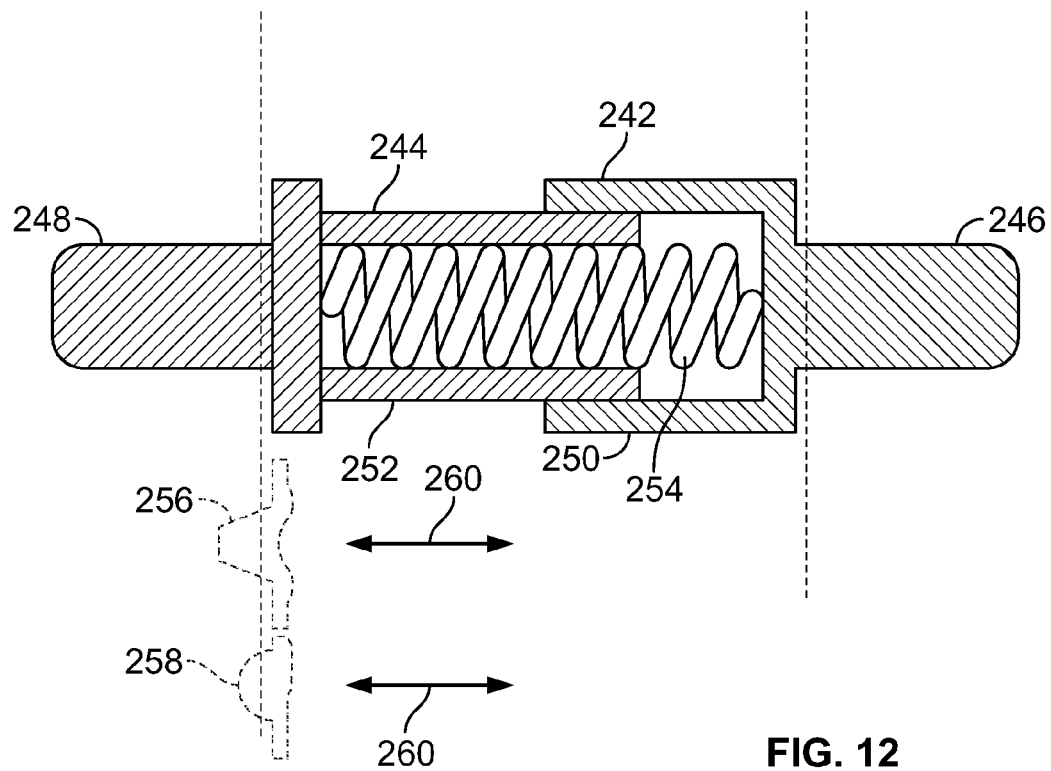
FIG. 12 is an exemplary embodiment of a retention device of the present invention.

FIGS. 11-12 show an embodiment of a rotary chopper assembly 200 that is similar to rotary chopper assembly 100 (FIG. 8). Retention device 240, which in its extended or engaged position prevents relative rotational movement between knife blades 114 and mounting lug 112 about first axis 120, includes a first portion 242 and a second portion 244. Retention device 240 is inserted in second bore 126 of mounting lug 112 between the pair of knife blades 114. First portion 242 includes a hollow body 250 that is configured to receive second portion 244. Hollow body 250 extends to a shear pin 246 is configured to be received by an opening formed in knife blade 114, such as those previously discussed in FIGS. 4-5. Similarly, second portion 244 includes a hollow body 252 that extends to a shear pin 248 which is configured to be received by an opening formed in knife blade 114, such as those previously discussed in FIGS. 4-5. A resilient device such as a spring 254 is positioned within each of the respective hollow bodies 250, 252 of the first and second portions 242, 244. Spring 254 is sized to bias or urge first and second portions 242, 244 away from each other along second axis 156 so that shear pins 246, 248 are received in a respective opening formed in the corresponding knife blades. In response to the knife blades encountering an impact load (see shear force 54 in FIG. 2) exceeding the predetermined shear load capacity of the shear pins 246, 248 of retention device 240, the shear pins are sheared off or otherwise separated from retention device 240. Once the shear pins have been sheared off of retention device 240, knife blades 114 are then rotatable about first axis 120. As further shown in FIG. 12, alternate embodiments of retention device 240 may include a tapered end 256 or a curved end 258, permitting axial movement 260 of each of first and second portions 242, 244 without shearing off of a tapered end or the curved end constructions. That is, in response to the knife blades encountering an impact load (see shear force 54 in FIG. 2) exceeding the predetermined shear load capacity of the ends 256, 258 of retention device 240, instead of the ends shearing off as would occur with shear pins 246, 248, the ends 256, 258 axially retract along second axis 156 toward each other, resulting in a disengagement between the ends and the respective openings of the knife blades.

In one embodiment, first and second portions 242, 244 may include a retention feature (not shown) to prevent inadvertent separation of the respective first and second portions in case the disengaged ends 256, 258 of retention device 240 are not maintained in contact with the rotating knife blades 114. That is, as further shown in FIG. 2, the knife blades (14 in FIG. 2) may be sufficiently rotated about the first axis (20 in FIG. 2) so that the ends of the retention device are no longer in contact with the inside surface of the knife blades. In response to rotating the knife blades to a desired position in which respective openings of the knife blades aligned with the ends of the retention device, the ends could be reengaged with the corresponding openings formed in the knife blades. In other words ends 256, 258 of retention device 240 would at least temporarily permit rotary chopper assembly 200 to operate as a flail-type cutter, but upon re-engagement of the ends with their respective openings formed in the knife blades, the rotary chopper assembly would return to operation as a fixed-type cutter. In one embodiment, the return to operation as a fixed-type cutter from a flail-type cutter could occur as a result of continued operation of the rotary chopper assembly, in which the centrifugal force associated with rotational movement of chopper assembly may be sufficient for the knife blades to rotate about the first axis until the ends of the retention device reengage the respective openings of the knife blades.

FIGS. 13-15 show an embodiment of a rotary chopper assembly 300 that is similar to rotary chopper assembly 200 (FIG. 11). Retention device 340, which in its extended or engaged position prevents relative rotational movement between knife blades 314 and mounting lug 312 about first axis 120, includes a first portion 242 and a second portion 244. Retention device 340 is inserted in second bore 126 of mounting lug 312 between the pair of knife blades 314. First portion 242 includes a hollow body 250 that is configured to receive second portion 244. Hollow body 250 extends to a shear pin 346 that is configured to be received by an opening formed in knife blade 314, such as those previously discussed in FIGS. 4-5. Similarly, second portion 244 includes a hollow body 252 that extends to a shear pin 348 is configured to be received by an opening formed in knife blade 314, such as those previously discussed in FIGS. 4-5. A resilient device such as a spring 254 is positioned within each of the respective hollow bodies 250, 252 of the first and second portions 242, 244. Spring 254 is sized to bias or urge first and second portions 242, 244 away from each other along second axis 156 so that shear pins 346, 348 are received in a respective opening formed in the corresponding knife blades. In response to the knife blades encountering an impact load (see shear force 54 in FIG. 2) exceeding the predetermined shear load capacity of the shear pins 346, 348 of retention device 340, the shear pins are sheared off or otherwise separated from retention device 340. Once the shear pins have been sheared off of retention device 340, knife blades 314 are then rotatable about first axis 120. As further shown in FIGS. 13 and 15, an exemplary opening 320 formed in knife blade 314 includes a counterbore that is sized to permit partial insertion of respective shear pins 346, 348. By virtue of the counterbore formed in opening 320 of the knife blade, each of the shear pins 346, 348 include a first shear plane 330 and a second shear plane 332. That is, each of shear pins 346, 348 is configured to be usable after each of the shear pins have been sheared along their respective shear plane. In other words, even if shear pins 346, 348 are sheared off along the first shear plane 330, each of the shear pins would still maintain a portion of the shear pin, identified in FIG. 15 between first shear plane 330 and second shear plane 332, and be capable of reinsertion in the respective opening 320 until the pins are sheared along the second shear plane 332.

As further shown FIG. 14, knife blade 314 may optionally include a sloped recess 334 formed in the knife blade connecting opening 320 and extending radially spaced from first axis 120 so that respective disengaged shear pins 346, 348 of retention device 340, or disengaged ends 246, 248, 256, 258 of retention device 240 of FIG. 12 may more easily reengage opening 320. That is, sloped recess 334 has a depth formed in the direction of its thickness that increases from a first position 336 in close proximity to opening 320, having a minimum depth, to a second position 338 that is shown in close proximity to a distal side of knife blade 314 and having a maximum depth. In one embodiment, first position 336 may be substantially flush (zero depth) with the surface in close proximity to opening 320, gradually increasing to a second position 338 having a depth that is substantially the thickness of the knife blade. It is to be understood that the sloped recess may be used with any of the opening arrangements such as shown in FIGS. 4-5. Is also to be understood that any combination of mounting lug stops may also be utilized with any of the embodiments, such as those shown in the figures. It is further to be understood that different combinations of shear pins and or ends (FIGS. 12 and 15) may be utilized as well as other configurations not specifically shown herein.

Figure 16:
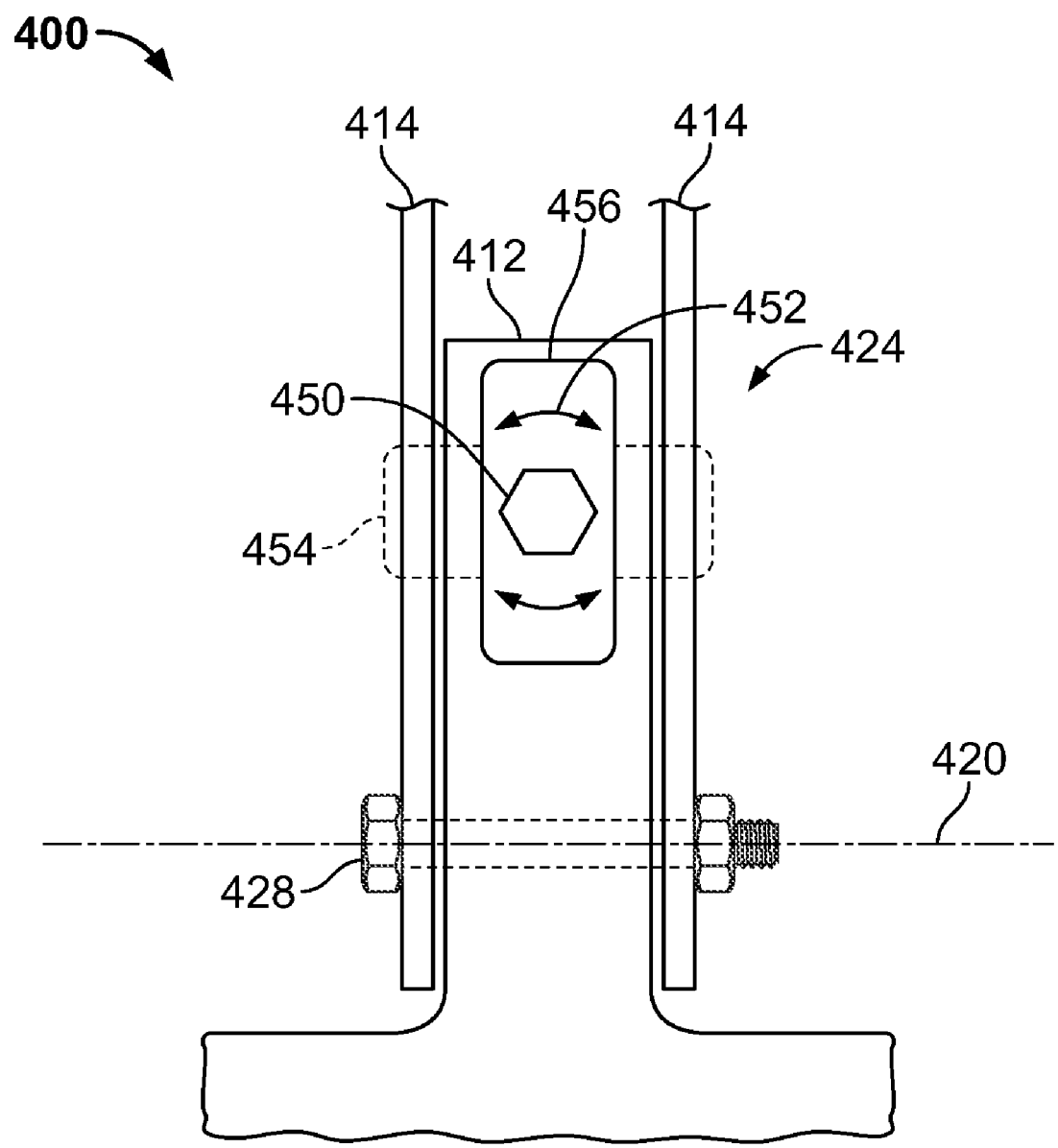
FIG. 16 is an alternate embodiment of a rotor chopper assembly of the present invention.

FIG. 16 shows a rotor chopper assembly 400 similar to rotary chopper assembly 200 (FIG. 11). A retention device 424 is configured for rotational movement in direction 452 and secured in position by fastener 450. The axis for rotational movement in direction 452 along fastener 450 is shown substantially perpendicular to first axis 420. First axis 420 defines the axis of rotational movement of knife blades 414 with respect to mounting lug 412. When retention device 424 is positioned at or in close proximity to a non-engaged position 456 as shown in FIG. 16, knife blades 414 can rotate about first axis 420 with respect to mounting lug 412. However, when retention device 424 is positioned at or in close proximity to an engaged position 454 as shown in FIG. 16, knife blades 414 is prevented from rotating about first axis 420 with respect to mounting lug 412. In the engaged position 454, opposed portions of retention device 424 engage corresponding openings formed in knife blades 414 as previously discussed. That is, in the engaged position 454 with retention device 424, knife blades 414 define a fixed-type cutter, while in the non-engaged position 456, knife blades 414 define a flail-type cutter. It is to be understood that knife blades 414 may include an opening arrangement similar to that shown in FIGS. 4 and 5. In one embodiment, the opening arrangement may include a single opening formed in each of the knife blades.

It is to be understood that different combinations of stops associated with the mounting lug may also be utilized with any of the embodiments shown in the figures, as well as other configurations not specifically shown herein.

It is to be understood that retention device may include a shear pin and/a retractable end, and that in one embodiment, a retention device may include a shear pin at one end and a retractable end opposite the one end, if desired.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A knife blade of a rotor chopper assembly comprising:
a body having an arrangement of openings, each opening of the arrangement of openings receives a retention device securing the body to a member that is rotatably connected about a first axis to a mounting lug of a chopper rotor, wherein at least one opening of the arrangement of openings includes a recess formed in the knife blade that extends along a radial distance from the at least one opening and the first axis, the first axis being substantially parallel to the axis of rotation of the chopper rotor;
the body is centrifugally urged radially outward from the mounting lug about the first axis, wherein the retention device and the first axis defining a second axis;
wherein if the body strikes an obstruction during operation of the rotor chopper assembly, the body is urged to rotate about the first axis until the retention device abuts a stop formed in the mounting lug, the retention device and the first axis defining a third axis;
wherein an angle subtended between the second axis and the third axis is different for at least two openings of the arrangement of openings formed in the body.

2. The knife blade of claim 1, wherein at least one opening of the arrangement of openings is sized differently than one of the other openings of the arrangement of openings.

3. The knife blade of claim 1, wherein at least one opening of the arrangement of openings is positioned at a different radial distance from the first axis.

4. The knife blade of claim 1, wherein each opening of the arrangement of openings is positioned at a different radial distance from the first axis.

5. The knife blade of claim 1, wherein the recess is sloped.

6. A rotor chopper assembly comprising:
a chopper rotor having a mounting lug;
a knife blade comprising a body having an opening arrangement, each opening of the opening arrangement receives a retention device securing the body to a member that is rotatably connected about a first axis to the mounting lug of the chopper rotor, wherein at least one opening of the opening arrangement includes a recess formed in the knife blade that extends along a radial distance from the at least one opening and the first axis the first axis being substantially parallel to the axis of rotation of the chopper rotor;
the body is centrifugally urged radially outward from the mounting lug about the first axis, wherein the retention device and the first axis defining a second axis;
if the body strikes an obstruction during operation of the rotor chopper assembly, the body is urged to rotate about the first axis until the retention device abuts a stop formed in the mounting lug, the retention device and the first axis defining a third axis;
wherein an angle subtended between the second axis and the third axis is selectably alterable.

7. The chopper assembly of claim 6, wherein the opening arrangement includes a single opening.

8. The chopper assembly of claim 6, wherein the opening arrangement includes a plurality of openings.

9. The chopper assembly of claim 6, wherein the stop defines a different position for the third axis, in response to the length of the retention device.

10. The chopper assembly of claim 6, wherein the stop is securable to the mounting lug.

11. The chopper assembly of claim 6, wherein the stop is formed in the mounting lug.

12. A rotor chopper assembly comprising:
a knife blade comprising a body having a first aperture and an opening arrangement, the first aperture is aligned with a first bore of a mounting lug of a chopper rotor to receive a fastener defining a first axis that is substantially parallel to the axis of rotation of the chopper rotor, wherein the first aperature includes a recess formed in the knife blade that extends along a radial distance from the at least one opening and the first axis;
each opening of the opening arrangement receives a retention device securing the body to a second bore formed in the mounting lug, the retention device defining a second axis that is substantially parallel to the first axis;
the first axis fastener and the second axis retention device non-rotatably securing the body to the mounting lug of the chopper rotor during operating of the rotor chopper assembly in which impact loads encountered by the body do not exceed a predetermined shear load capability of the retention device;

if the body encounters an impact load exceeding the predetermined shear load capacity of the retention device, the body is rotatable about the first axis;

wherein the retention device is removable to selectably convert the body between a non-rotatable and a rotatable relationship with respect to the mounting lug;

wherein an angular orientation between the body in the non-rotatable relationship with respect to the mounting lug is selectably alterable.

13. The chopper assembly of claim 12, wherein the opening arrangement includes at least one opening and the mounting lug further comprises a stop configured to define a different angular orientation between the body and the mounting lug in response to the length of the retention device.

14. The chopper assembly of claim 12, wherein the opening arrangement includes at least two openings, the angular orientation being selectably alterable in response to which opening of the opening arrangement the retention device is inserted.

15. The chopper assembly of claim 13, wherein the stop is formed in the mounting lug.

16. A rotor chopper assembly comprising:
a knife blade comprising a body having a first aperture and an opening, the first aperture is aligned with a first bore of a mounting lug of a chopper rotor to receive a fastener defining a first axis that is substantially parallel to the axis of rotation of the chopper rotor, wherein the first aperature includes a recess formed in the knife blade that extends along a radial distance from the at least one opening and the first axis;

the opening receives a retention device securing the body to a second bore formed in the mounting lug, the retention device defining a second axis that is substantially parallel to the first axis;

the first axis fastener and the second axis retention device non-rotatably securing the body to the mounting lug of the chopper rotor during operating of the rotor chopper assembly in which impact loads encountered by the body do not exceed a predetermined shear load capability of the retention device;

if the body encounters an impact load exceeding the predetermined shear load capacity of the retention device, the body is temporarily rotatable about the first axis, and the retention device reengages the opening.

17. The chopper assembly of claim 16, wherein the retention device comprises a first portion and a second portion movable by a resilient device along the second axis, the first portion and the second portion each including one of a shear pin or a retractable end.

18. The chopper assembly of claim 17, wherein the shear pin includes at least a first shear plane and a second shear plane.

19. A rotor chopper assembly comprising:
a knife blade comprising a body having a first aperture and an opening arrangement, the first aperture is aligned with a first bore of a mounting lug of a chopper rotor to receive a fastener defining a first axis that is substantially parallel to the axis of rotation of the chopper rotor, wherein first aperature includes a recess formed in the knife blade that extends along a radial distance from the at least one opening and the first axis;

the opening arrangement receives a retention device securing the body in a non-rotatable relationship with respect to the mounting lug when the retention device is in a first position, the retention device selectably movable to a second position that does not engage the body;

the first axis fastener and the retention device when selectably in the first position non-rotatably securing the body to the mounting lug of the chopper rotor during operating of the rotor chopper assembly in which impact loads encountered by the body do not exceed a predetermined shear load capability of the retention device;

if the body encounters an impact load exceeding the predetermined shear load capacity of the retention device, the body is rotatable about the first axis;

wherein the retention device is movable between the first position and the second position to selectably convert the body between a non-rotatable and a rotatable relationship with respect to the mounting lug;

wherein an angular orientation between the body in the non-rotatable relationship with respect to the mounting lug is selectably alterable.

* * * * *